E. E. CHANDLER.
TRACTOR.
APPLICATION FILED AUG. 8, 1917.

1,307,481.

Patented June 24, 1919.
2 SHEETS—SHEET 1.

WITNESSES
Hugh A. Huddleson.
J. W. Richardson

Elbert E. Chandler
INVENTOR

E. E. CHANDLER.
TRACTOR.
APPLICATION FILED AUG. 8, 1917.
1,307,481.
Patented June 24, 1919.
2 SHEETS—SHEET 2.
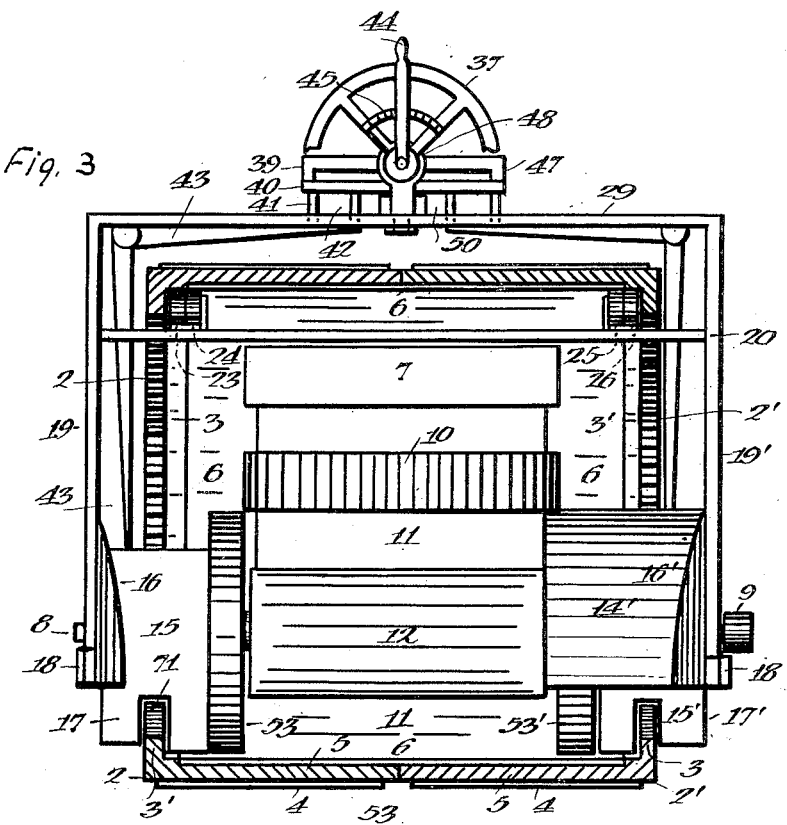
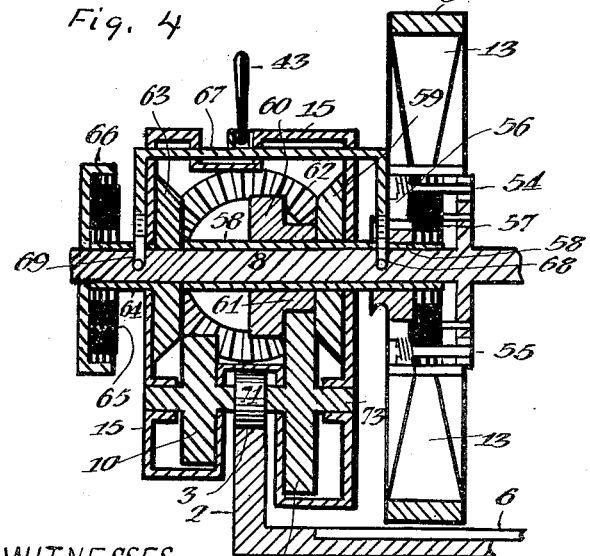
WITNESSES
Hugh A Huddleson
J. W. Richardson
Elbert E. Chandler
INVENTOR

UNITED STATES PATENT OFFICE.

ELBERT E. CHANDLER, OF EAGLE ROCK, CALIFORNIA.

TRACTOR.

1,307,481.  Specification of Letters Patent.  Patented June 24, 1919.

Application filed August 8, 1917. Serial No. 185,053.

*To all whom it may concern:*

Be it known that I, ELBERT E. CHANDLER, a citizen of the United States, residing at Eagle Rock, in the county of Los Angeles and State of California, have invented a new and useful Tractor, of which the following is a specification.

My invention relates to tractors, which are guided by separate or opposite action of driving wheels; and the objects of my improvements are: to prevent the accumulation of dirt on the peripheries of the driving wheels as well as to prevent its entrance into their interior, perpendicularly through their faces; to prevent the entrance of dirt into their interior at their sides; to obtain a short turning radius; to guide by driving and by hand; and to provide a simple direct, reverse and change gear system.

I attain these objects by a traction wheel system, a ventilating and cooling system, a frame system, composed of a wheel frame and a main frame, a control system, and a transmission system.

Figure 1:
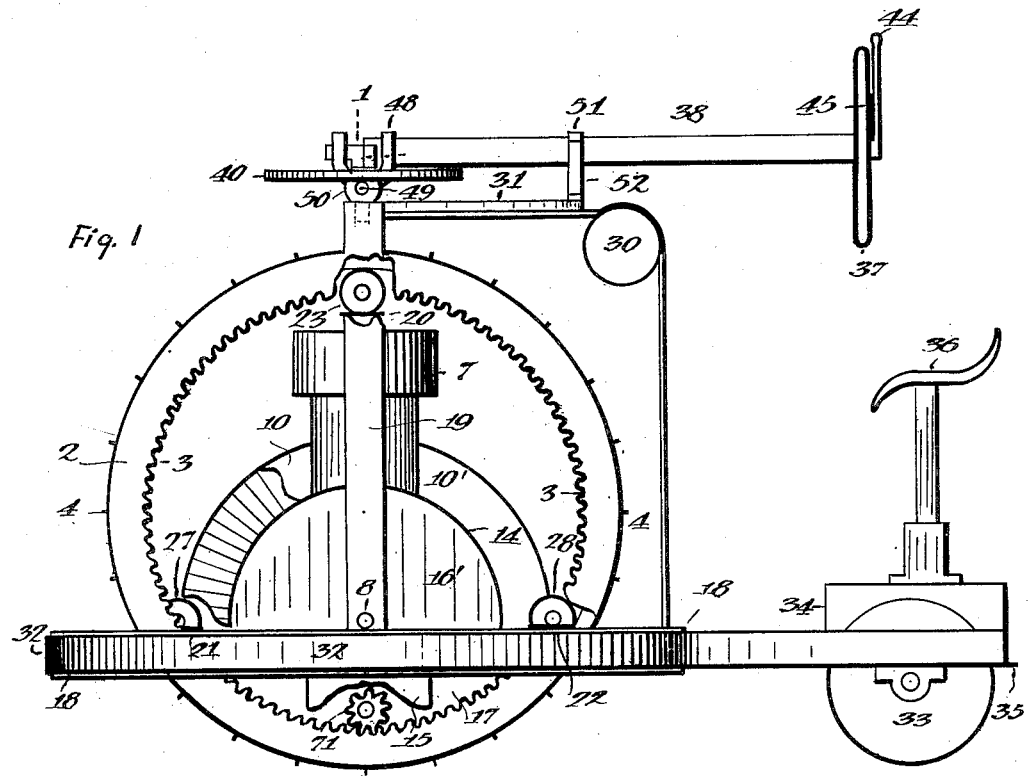
Figure 2:
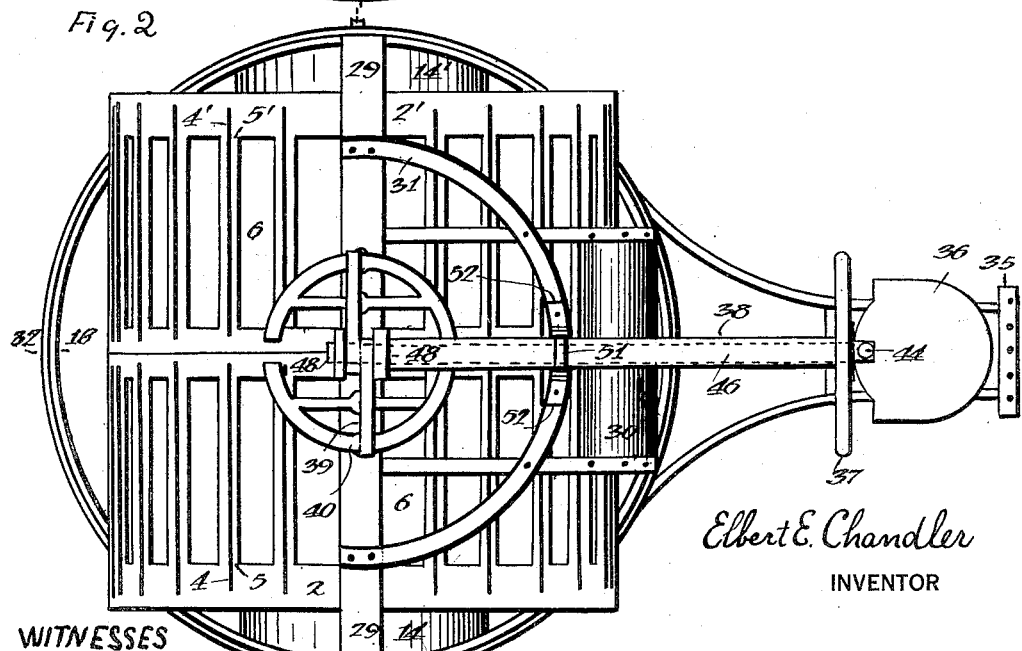

These systems are illustrated in the accompanying drawings in which Figure 1 is a left side view, Fig. 2 is a top view, Fig. 3 is a cross section view of Figs. 1 and 2 along the line 1—1, and Fig. 4 is a cross section view of the left transmission system.

Similar figures refer to similar parts throughout the several views.

*The traction wheel system.*

2 and 2' are left and right driving wheels respectively. They are coaxial with each other and are hubless and spokeless. Their faces are not continuous, but are gridform. There grid wheels carry the main gears 3 and 3', the toes 4 and 4', which help form the grids 5 and 5' and are preferably of one steel casting. 6 is also a hollow wheel, preferably made of boiler plate. Its face is continuous, covering the inter-grid spaces and thus preventing the entrance of dirt to the interior, through them.

This shell wheel is not driven, except by the friction of the grid wheels which encircle and rest upon it. As the grid wheels are driven independently and also in some cases oppositely, each will at times rotate around the shell wheel as a bearing and their grids will act as scrapers on the shell wheel, disengaging any dirt that may tend to accumulate upon it and between their toes and grids.

*The ventilating and cooling system.*

The internal combustion engine 7 is located inside the hollow traction wheel system, so that its crank shaft 8 is parallel to the common axis of these wheels. The left and right ends of the shaft drive the left and right grid wheels independently through left and right transmission systems near their ground contact, thus avoiding strains on the mechanism. 9 is a belt wheel for stationary use.

This interior power plant, the two quarter-circular radiators 10 and 10', the bonnets 14 and 14' and the transverse members 21 and 22 of the wheel frame, all serve to divide the cylindrical interior of the driving wheel system more or less segmentally into upper and lower air conduits.

The vanes 13 of the left fly wheel and the corresponding vanes of the right fly wheel are slanted oppositely, so that the revolution of the engine circulates air inwardly and oppositely through the upper conduit, downwardly through the radiators, outwardly and oppositely through the annular space 11 formed between the radiators, the transverse wheel frame members, the lower portion of the shell wheel and the engine bed 12, thence past the vanes and forces it outwardly and downwardly past the transmission boxes 15 and 15'. The frame plates 16 and 16' prevent the air from escaping directly outwardly and cause it to be discharged at or near the ground at the openings 17 and 17'.

The general effect of this ventilating and cooling system is to draw clean air into the hollow driving wheels at some distance above the ground and after cooling the engine to discharge it at or near the ground and thus prevent the entrance of dirt to the interior at this point. It is evident that the same result may be accomplished by locating the radiators and fans elsewhere and I do not limit myself to this particular arrangement, but desire to cover as broadly as possible the general feature of circulating air inwardly at the upper part of hollow driving wheels and outwardly at their lower portion.

The frame system.

This is composed of a wheel frame inclosing the driving wheels and a main frame inclosing the wheel frame. 18 is a circular horizontal member of the wheel frame. It is placed near the ground so as to make the engine more accessible, to diminish strains on the mechanism and to allow of a smaller diameter. Attached to this by the curved plate 16 and 16' are the uprights 19 and 19', which carry the upper transverse member 20. The members 20, 21 and 22 help to carry the power plant radiators and transmission boxes. They also carry by means of brackets the roller bearings wheels 23, 24, 25, 26, 27, 28 and other similar wheels not shown. These wheels are in pairs, coaxial with each other and support respectively the shell and grid wheels. 29 is also a transverse member of the wheel frame and it supports the front end of the control system. 30 is a fuel tank carried by bands attached to the members 18 and 29. 31 is a track supporting the rear portion of the control system.

32 is a horizontal member of the main frame encircling the circular member 18 of the wheel frame. The wheel frame is rotatable within the main frame to any desired degree. 33 is a trailer wheel, 34 a fender, 35 a hitch rack for the drawn implement and 36 a seat rotatable horizontally to allow the operator to adjust the implement.

The control system.

37 is a steering wheel, connected by the tube shaft 38 to the left cam 39, which may depress the track 40, the connections 41 and 42 and the bell crank lever 43, so as to move its lower arm outwardly. The hand lever 44, engageable with the steering wheel through the ratchet 45 is attached by the inner steering shaft 46 to the right cam 47, which may in like manner operate the right bell crank lever arm outwardly.

The front ends of these shafts are carried by the clevis 48, rotatable vertically on the pin 49 of the lower clevis 50, which is horizontally rotatable in the wheel frame member 29. The outer steering shaft carries the cam 51, between the stop blocks 52 and 52', which are adjustable on the track 31. The steering wheel may also be provided with the usual change gear, throttle and spark levers, operating their respective parts in a similar manner to the steering gear, but these are omitted for the sake of simplicity.

The transmission system.

This will be described principally with reference to Fig. 4. The fly wheel 53 is attached to the engine shaft 8. The spring bolts 54 and 55, attached to the grooved hub plate wheel 56 and to the fly wheel carry the outer disks of the clutch 57. The inner disks are slidable but not rotatable on the sleeve 58, which is integral with the bevel gear wheel 59. Slidable but not rotatable on this are the change gears 60 and 61, which are attached to each other. The bevel gear 59 meshes with a pair of bevel gears on a perpendicular axis of which 62 is the only one shown. These mesh with the bevel gear 63, integral with another sleeve 64 on which is slidable but not rotatable the inner disks of the clutch 65. The outer disks of this outside clutch are slidable but not rotatable with the cup wheel 66, which is keyed to the engine shaft. 67 is a shaft operated by the lower arm of the bell crank lever 43 and is slidable by it in the gear box 15. It carries the yokes 68 and 69, which operate the two clutches. The gears 70, 71 and 72 are integral with the counter shaft 73, connecting the gears 60 and 61 with the gears 3.

Operation.

Starting, stopping, reversing, guiding by hand, guiding by driving and changing gears are accomplished as follows, assuming the machine in Figs. 1 and 2 to be progressing when moving to the left and in Fig. 3, when entering the plane of the paper.

Before starting the engine, all clutches must be disengaged. This is accomplished by locking the steering wheel 37 and the hand lever 44 to each other by means of the ratchet segment 45, so that the spring bolts 54 and 55 will not hold the inside clutches in engagement. The steering wheel and hand lever are then unlocked and the clutches allowed to come into engagement and the machine goes forward.

It is stopped by again locking or holding the steering devices in a neutral position.

It is reversed by operating the steering devices still farther in the direction used in stopping and until the outside clutches come into engagement. The cup 66 then rotates the bevel gear 63 in the same direction as the engine is rotating and the gear 62 then rotates the gear 59 in an opposite direction and the machine reverses its direction.

Guiding by hand is accomplished while the steering shafts remain between the stop blocks 51 and 52, by pressing the steering wheel in an opposite direction to that which it is desired the tractor to turn. This turns the wheel frame in the main frame.

Steering by driving is accomplished in two ways. If it is desired to turn the machine only slightly, the steering wheel, having the steering lever locked to it in a suitable position is rotated in the direction to which it is desired the tractor to turn. This disengages the inside clutch on that side, leaving the inside clutch on the other side in duty. The outside traction wheel is still driven and the inside one is not, so that the machine turns to the side of the latter. The steering shafts may be left in between the stop blocks in this maneuver and the position of these brings the rotation of the steering system to a halt by means of the cam 51. When the turning movement has progressed far enough the steering system is rotated in the opposite direction till the inside traction wheel is again engaged.

If it is desired to turn the tractor still more sharply the steering shafts are lifted from between the stop blocks and the steering system rotated still farther in the direction to which it is desired to turn and until the inside clutch on that side is not only disengaged, but the outside one brought into operation. This will reverse the direction of rotation of the traction wheel on that side as in backing. One wheel will be moving one way and the other the other and the wheel frame will turn in the main frame without the tractor progressing in the least. The tractor may thus turn through an angle of ninety degrees or greater.

Gear changing is accomplished by sliding the gears 60 and 61 and like ones on the right side of the tractor outward, until 60 engages 70. This will give a faster speed to the tractor. The mechanism for doing this is omitted for the sake of simplicity.

Having thus described my invention, under the headings:—The traction wheel system, The ventilating and cooling system, The frame system, The control system and The transmission system, I desire to cover as broadly as possible certain combinations in them and of them.

I claim;—

1. The combination in a tractor, of a grid-form-faced driving wheel and a concentrically inclosed shell wheel, covering the inter-grid spaces.

2. The combination in a tractor, of right and left, hollow, grid-form-faced driving wheels; a shell wheel, covering their inter-grid spaces; and a power plant, inside of these wheels.

3. The combination in a tractor, of hollow driving wheels; a power plant, inside of them, which with other means, divides their cylindrical interior more or less segmentally into upper and lower air conduits; and means for circulating air inwardly through the upper conduits and outwardly through the lower ones.

4. The combination in a tractor, of right and left hollow driving wheels; a power plant inside of them; a wheel frame encircling them and supporting the power plant; a main frace encircling the wheel frame horizontally; and means for operating the driving wheels separately or oppositely and thus rotating the wheel frame in the main frame.

5. The combination is a tractor, of a power plant; hollow driving wheels, encircling the power plant; a wheel frame, inclosing the driving wheels; a main frame inclosing the wheel frame; means for rotating the wheel frame within the main frame, by the independent operation of the driving wheels; and means for rotating the wheel frame in the main frame by hand.

ELBERT E. CHANDLER.